Figure 4:
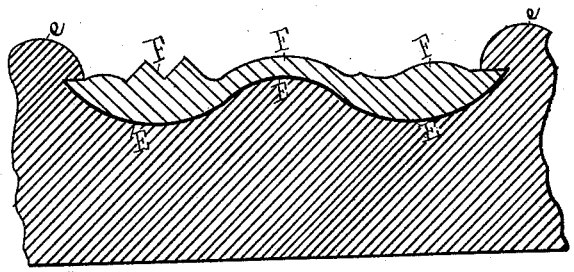

(No Model.) 2 Sheets—Sheet 1.
F. BECK.
MOLDING OR OTHER IRREGULAR SURFACE.
No. 303,356. Patented Aug. 12, 1884.
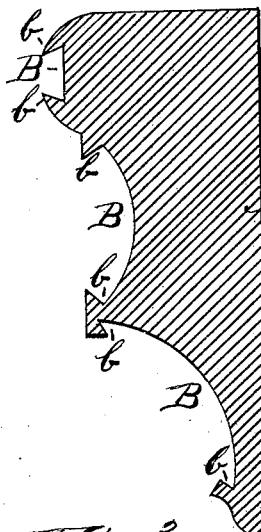
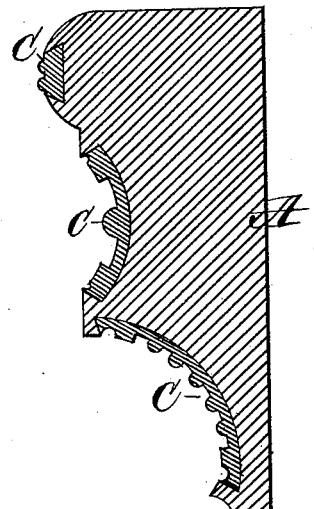
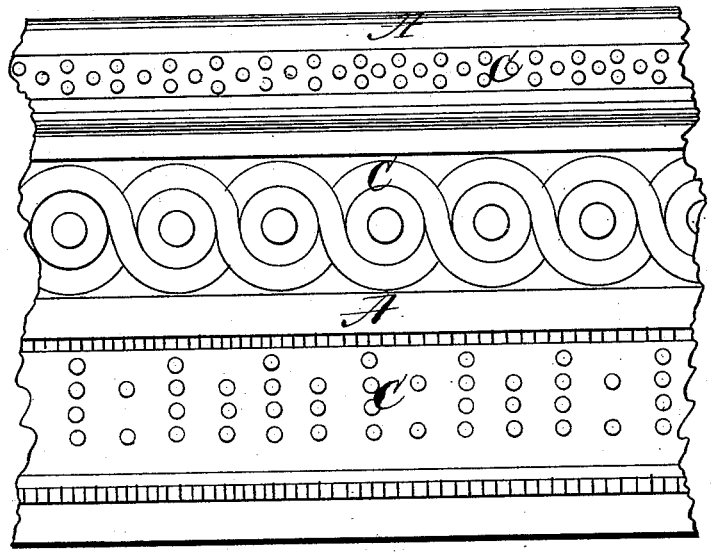
Witnesses.
Phillips Abbott.
Walter H. Crittenden.
Inventor.
Frederick Beck by
Wetmore and Jenner
his Attorneys.

(No Model.) 2 Sheets—Sheet 2.

F. BECK.
MOLDING OR OTHER IRREGULAR SURFACE.

No. 303,356. Patented Aug. 12, 1884.

Witnesses:
Joseph L. Levy
John J. Cauldwell

Inventor:—
Frederick Beck
by Wetmore & Jenner
his Attorneys.

UNITED STATES PATENT OFFICE.

FREDERICK BECK, OF NEW YORK, N. Y.

MOLDING OR OTHER IRREGULAR SURFACE.

SPECIFICATION forming part of Letters Patent No. 303,356, dated August 12, 1884.

Application filed April 21, 1884. (No model.)

*To all whom it may concern:*

Be it known that I, FREDERICK BECK, a citizen of the United States, and a resident of New York city, in the county of New York and State of New York, have invented certain new and useful Improvements in Moldings and other Irregular Surfaces, of which the following is a specification.

My invention relates to an improvement in the manufacture of moldings or other irregular surfaces; and it consists in cutting a rabbet or recess into the molding, which recess or rabbet shall have undercut or dovetailing sides, and into this recess or rabbet I slide strips of material cut of suitable width to properly fill the recess or rabbet and be bound therein by its edges engaging with the undercut sides of the recess.

My invention also consists in the use of pliant substances forming a backing on which, when flat, I spread plastic or other material, and mold or otherwise give it the desired shape, if it requires molding or shaping, and ornament it as desired; and when finished I can spring the backing to cause it to conform to the shape of the recess, and thus easily and quickly produce an ornamented molding at much less cost and of greater beauty than other moldings, because the ornamentation being done while the material is flat, it is much more perfect and uniform, and much more quickly and easily done.

In the drawings the same letters designate the same parts in all the figures.

Figure 1 shows a cross-section of the molding, showing the recesses for the reception of the ornamented strips. Fig. 2 shows a cross-section with the ornamented strips in position. Fig. 3 shows a front view of the molding with the strips in position. Fig. 4 is a cross-section of the strip, showing the pliant backing with the plastic material spread upon it.

A is the base or body of the molding. It may be made in any desired shape.

B B are the recesses or rabbets cut in the molding, provided with undercut or dovetailing sides or edges *b b*.

C C are the ornamented strips. They may be composed of any suitable substance.

The invention is especially intended by me to be used in the manufacture of ornamented moldings, in which the substance or composition called "lincrusta"—*i. e.*, oxidized oil and paper-pulp or other like substance mixed together—is molded into ornamented relief or intaglio work. When using lincrusta for this purpose, it is spread on cloth or paper and while plastic molded into the desired pattern or design. This can then be colored, if desired, and, when finished and partly or entirely hardened, be readily cut up into strips to fit the recesses B, which strips can be quickly and easily bent to conform to the shape of the recesses, and slid into them and secured there with glue or other adhesive substance, or by the dovetailing ends *b b* alone, if desired, or otherwise. If the edges of the recesses be undercut to form dovetails, then the edges of the ornamented strips will be cut to conform to such edges.

In Fig. 4 I show in cross-section a strip of material to be inserted in the recess. E E is the backing, made of linen or other pliant material, and F F is the lincrusta or other plastic material spread upon the backing E. This may be done when the backing is lying flat, and the plastic material F may be ornamented in any desired manner, also, when flat; and then, being made of the suitable width, the strip can be bent and slid into its place, the edges catching under the dovetailing edges *e e*, as seen, and it will conform to the irregularities of the surface, as shown; but I do not confine myself to the use of this pliant backing in connection with undercut edges to the recesses alone.

I do not limit myself to lincrusta, nor to a flexible substance, since strips of molded papier-maché, plaster-of-paris, either on a backing or not, and other substances, either flexible, semi-flexible, or rigid, may be employed in substantially the same manner.

I claim—

1. As a new article of manufacture, a strip of material adapted to be used as a molding or part thereof, having recesses cut therein for the reception of ornamented pieces or strips of material, the edges of said recesses being undercut, substantially as and for the purposes set forth.

2. As a new article of manufacture, a strip of material adapted to be used as a molding or part thereof, having ornamented strips or pieces of material inserted in recesses made in its face, the sides of the recesses being undercut and the inserted strips or pieces having their edges conforming to the undercut edges of the recesses, whereby the inserted pieces may be held in position by the edges of the recesses alone, substantially as and for the purposes set forth.

3. The combination of the base or body of the molding A, provided with recesses B and ornamented strips of plastic material placed upon a backing of cloth, paper, or other pliant substance, and inserted in the recesses B, substantially as and for the purposes set forth.

4. As a new article of manufacture, material for ornamenting moldings, cornices, &c., composed of a plastic body placed on a pliant backing and cut into suitable widths, to be inserted in the cornice or molding, substantially as and for the purposes set forth.

Signed at New York city, in the county of New York and State of New York, this 17th day of April, A. D. 1884.

FR. BECK.

Witnesses:
PHILLIPS ABBOTT,
WALTER H. CRITTENDEN.